Dec. 26, 1950    F. B. BERGER    2,535,257
ELECTRICAL CIRCUIT
Filed May 3, 1945
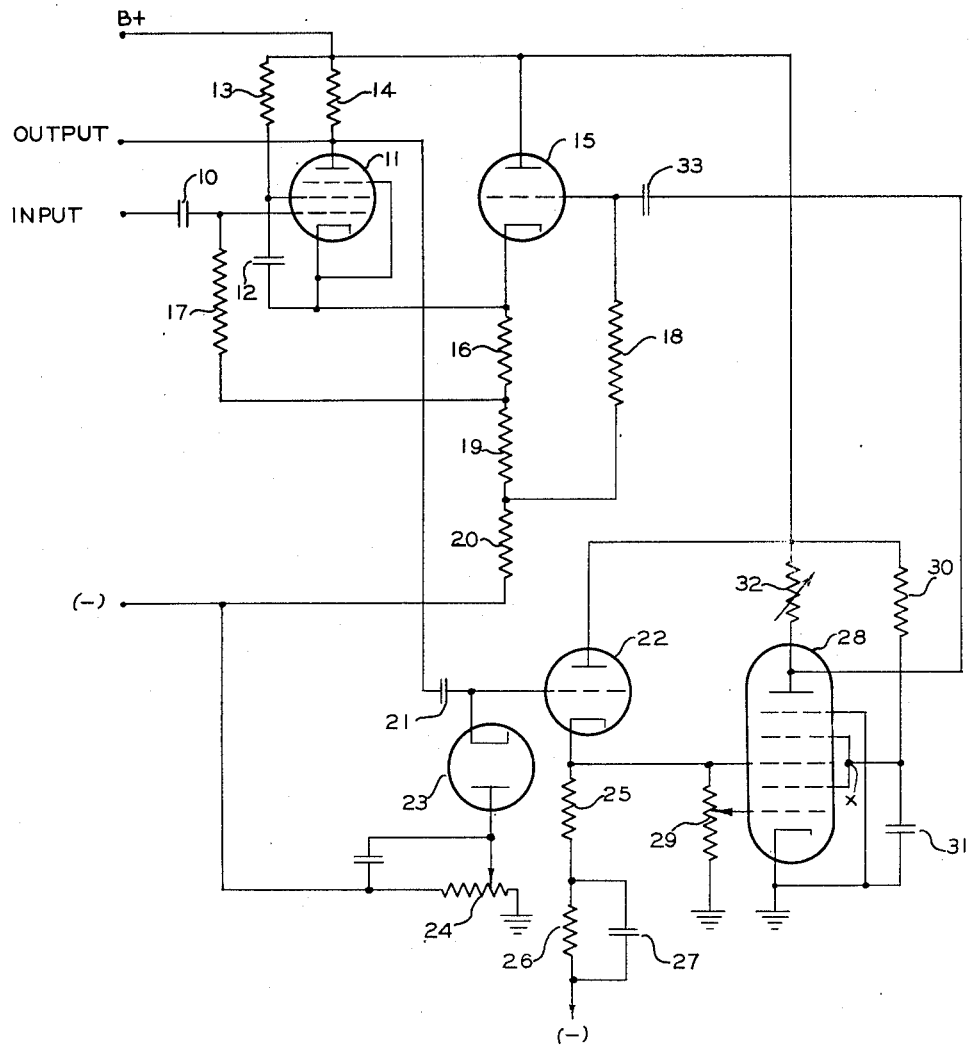
INVENTOR.
FRANCE B. BERGER
BY
*William D. Hall.*
ATTORNEY Patented Dec. 26, 1950

2,535,257

UNITED STATES PATENT OFFICE 2,535,257

ELECTRICAL CIRCUIT

France B. Berger, Watertown, Mass., assignor, by mesne assignments, to the United States of America as represented by the Secretary of War Application May 3, 1945, Serial No. 591,747

2 Claims. (Cl. 250—27)

This invention relates in general to electrical circuits and more particularly to such circuits in which the output voltage is the square root of the input voltage.

Under some conditions it may be desirable to provide a circuit having a characteristic of producing an output voltage which is the square root of the input voltage at any instant. Circuit simplicity and low power consumption in such a circuit are important for some purposes.

Among the objects of my invention, therefore, are:

1. To provide an electronic circuit in which the output voltage is the square root of the input voltage.

2. To provide such a circuit which uses a comparatively small number of elements.

In accordance with the present invention there is provided a multigrid tube having two of its grids with substantially the same amplification characteristics connected together working with a differential amplifier. The output voltage of the multigrid tube is caused to be nearly equal to the input voltage of the differential amplifier. Thus the voltage on the aforementioned grids of the multigrid tube will be the square root of the input voltage to the differential amplifier.

My invention will best be understood by reference to the drawing, which is a schematic diagram of the complete circuit.

Referring now to the description of the circuit and to the drawing, the input, as marked, is fed through condenser 10 to the control grid of pentode 11. The screen grid of pentode 11 is connected to the cathode through by-pass condenser 12, and to B plus through screen-dropping resistor 13. The suppressor grid of tube 11 is connected directly to the cathode. The plate of tube 11 is connected to B plus through load resistor 14. Pentode 11 is one tube of a differential amplifier, the other tube being triode 15. The cathode of tube 15 is connected directly to the cathode of tube 11, and the plate of tube 15 is connected to B plus. The tubes 15 and 11 are cathode-coupled through resistor 16, resistor 17 acting as a grid leak for tube 11. The grid leak for tube 15 is resistor 18 which is tied to the bottom of cathode resistor 19. This point is tied to a negative potential through an additional resistor 20.

The output of the differential amplifier, the plate of tube 11, is fed through condenser 21 to the grid of tube 22, which is connected as a cathode follower. The grid of tube 22 is held at a negative potential by clamper diode 23, the cathode of which is tied to the grid of tube 22, and the plate of which is tied to the center tap of potentiometer 24, one end of which is grounded and the other end of which is connected to a negative voltage. The cathode of tube 22 is connected to a negative voltage through resistor 25 and a parallel network of resistor 26 and condenser 27. The cathode of tube 22 is connected to the third grid of multigrid tube 28, the grid leak for which is potentiometer 29, and to the first grid of tube 28 through the center tap of this potentiometer. The plate of tube 22 is connected to B plus. Grids #2 and #4 of tube 28 act as screens and are connected together, and to B plus through resistor 30, and to ground through capacitor 31. The suppresser grid of tube 28 is connected to ground. The plate of tube 28 is connected to B plus through variable resistor 32, and to the grid of tube 15 through capacitor 33.

Referring now to the operation of the system, it is seen that the input wave is placed on the grid of one tube 11 of the differential amplifier. The output of the differential amplifier is fed to the cathode follower, the output of which is fed into two grids of tube 28. Potentiometer 29 is set so that the effective amplifications of the signal of grids #1 and #3 are equal. In other words, grids #1 and #3 are characterized by the fact that they have substantially equal controlling effect upon the space current of the multigrid thermionic tube 28, whereby these grids have substantially equal amplification properties. The plate voltage of tube 28 therefore varies as the square of the input signal on grid #3. This voltage variation is fed to the grid of the other tube 15 of the differential amplifier. The action of the differential amplifier is to amplify the difference between the signal voltage on the grid of tube 11 and the signal voltage on the grid of tube 15. The constants of the circuit are set so that the signal voltage on the grid of tube 15 will arrange itself to be slightly less than the input voltage. This causes the voltage on grid #3 of tube 28 to be slightly less than the square root of the input voltage, and, since the cathode follower has a gain of a little less than unity, the cathode follower grid voltage and the plate voltage of tube 11, which is the output voltage, will be equal to the square root of the input signal.

The clamper tube 23 is used to keep a fairly constant value of bias voltage on the grid of tube 22. Normally if input signals of varying periods are impressed on a circuit of this sort, the quiescent grid voltage, which will determine the bias, will vary. Since it is desired to keep the bias constant, a diode is connected between grid and a negative potential. If the grid voltage goes below the voltage on the center tap of potentiometer 24, the diode will conduct with a low voltage drop across it, and the grid voltage will tend to be restored to its quiescent value.

The property of a cathode follower to isolate that portion of the circuit in which it is found is used to advantage here. Without this stage, the circuit is found to have a tendency to oscillate. Since the output impedance of a cathode follower stage is very small, the use of a stage of this type for isolation means reduces greatly the tendency to oscillate.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An electronic circuit comprising differential amplifier means, cathode follower means containing grid bias means, means connecting the output of said differential amplifier means to said cathode follower means, diode means to hold the grid bias of said cathode follower above a predetermined level, multigrid thermionic tube means containing two grids characterized by the fact that they have substantially equal controlling effect upon the space current of said multigrid thermionic tube means, means connecting the output of said cathode follower means to said grids, the output of said multigrid thermionic tube means being connected to said differential amplifier means, and means to hold the output potential of said multigrid thermionic tube means at substantially the same potential as the input of said differential amplifier means, thereby causing the input potential of the cathode follower means to be substantially equal to the square root of the input potential of the differential amplifier means.

2. An electronic circuit comprising differential amplifier means, cathode follower means, means connecting the output of said differential amplifier means to said cathode follower means, and multigrid thermionic tube means containing two grids characterized by the fact that they have substantially equal controlling effect upon the space current of said multigrid thermionic tube means, means connecting the output of said cathode follower means to said grids, the output of said multigrid thermionic tube means being connected to said differential amplifier means, and means to hold the output potential of said multigrid thermionic tube means at substantially the same potential as the input of said differential amplifier means, thereby causing the input potential of the cathode follower means to be substantially equal to the square root of the input potential of the differential amplifier means.

FRANCE B. BERGER.

REFERENCES CITED

The following references are of record in the file of this patent:

UNITED STATES PATENTS

| Number | Name | Date |
|---|---|---|
| 2,269,001 | Blumlein | Jan. 6, 1942 |
| 2,324,797 | Norton | July 20, 1943 |